United States Patent [19]

Parr et al.

[11] Patent Number: 5,513,221
[45] Date of Patent: Apr. 30, 1996

[54] DOPPLER BANDWIDTH DEPENDENT ESTIMATION OF A COMMUNICATIONS CHANNEL

[75] Inventors: Michael Parr; Long Huynh, both of San Diego, Calif.

[73] Assignee: Hughes Aircraft Company, Los Angeles, Calif.

[21] Appl. No.: 279,965

[22] Filed: Aug. 25, 1994

Related U.S. Application Data

[63] Continuation-in-part of Ser. No. 246,851, May 19, 1994, and Ser. No. 273,661, Jul. 11, 1994.

[51] Int. Cl.$^6$ .............................. H03H 7/30; H03H 7/40; H03K 5/159; H04L 27/06
[52] U.S. Cl. .................. 375/344; 364/724.19; 375/233; 375/232; 375/340
[58] Field of Search .............................. 375/13, 14, 15, 375/94, 95, 39, 229, 230, 232, 233, 234, 235, 266, 261, 340, 341, 348, 316, 344; 364/724.21, 724.19

[56] References Cited

U.S. PATENT DOCUMENTS 5,263,026  11/1993  Parr et al. ................................. 375/95
5,274,670  12/1993  Seizawa et al. ....................... 375/14 X

OTHER PUBLICATIONS

Huang et al, "A comparative study of two adaptive equalizers for mobile radio" Vehicular Technology, 1991 Conf. pp. 765–769.

*Primary Examiner*—Stephen Chin
*Assistant Examiner*—Bryan E. Webster
*Attorney, Agent, or Firm*—Gordon R. Lindeen, III; Wanda K. Denson-Low

[57] ABSTRACT

A device and method of adjusting an equalizer in a digital communications receiver in response to relative velocity between the communications receiver and a communications transmitter. A radio frequency receiver receives a radio frequency signal from the communications transmitter through a communications channel, and an analog to digital converter digitizes a first portion of the radio frequency signal during a first time period, and generates a first data signal made up of digital samples. The analog to digital converter also digitizes a second portion of the radio frequency signal during a second time period and generates a second data signal, also made up of samples. A channel estimator estimates characteristics of the communications channel in response to a portion of the first data signal, and generates a first channel estimate in response thereto. Finally, a processor determines an estimated velocity of the communications receiver relative to the communications transmitter, weights the first channel estimate in response to the estimated velocity, and generates a revised channel estimate in response to the weighting of the first channel estimate and the second data signal.

12 Claims, 6 Drawing Sheets

DOPPLER BANDWIDTH DEPENDENT ESTIMATION OF A COMMUNICATIONS CHANNEL

CROSS-REFERENCE TO RELATED APPLICATIONS

This application is a continuation-in-part of application Ser. Nos. 08/273,661 and 08/246,851 filed Jul. 11, 1994 and May 19, 1994 entitled "Time-Reversed Infinite Impulse Response Filtering of an Asymmetric Signal" and "Receiver Selection Based on Delay Spread Estimation" by Michael Parr (Ser. No. 08/273,661), and Long Huynh and Michael Parr (Ser. No. 08/246,851) and assigned to the assignee of the present application, the priorities of which are hereby claimed and the disclosures of which are hereby incorporated by reference fully herein.

BACKGROUND OF THE INVENTION

The present invention relates to estimation of a communications channel and adjustment of a receiver based on such estimation, and more particularly to Doppler bandwidth estimation for a receiver path and adjustment of a receiver equalizer based on such estimation. Even more particularly, the present invention relates to Doppler bandwidth estimation of a cellular telephone signal path, and selection of a maximum likelihood sequence estimating receiver equalizer based on such estimation.

Communication channels in the cellular environment commonly impose a combination of distorting effects on transmitted signals. Rayleigh fading, where a signal's perceived power level rises and falls rapidly over a wide range, results from the combination (interference) of signals that have traversed paths differing in length by at least a significant fraction of a wavelength (i.e., about 30 cm. for cellular). This type of interference is known as multi-path interference. Differences in path transmission times that approach the time taken to transmit a symbol result in a second problem called delay spread.

Delay spread results in reception of multiple delayed replicas of a transmitted signal. Each Rayleigh faded replica has randomly distributed amplitude and phase, and the rate at which this complex quantity varies is constrained by the Doppler bandwidth associated with a vehicle's speed, which is related to the velocity of, e.g., a mobile unit relative to a base station. In a frequency nonselective environment, the sampled outputs of a receiver's matched filter provide uncorrelated estimates of the transmitted data. As such, in terms of discrete time samples, the channel has exhibited an impulse response proportional to a delta function. With delay spread, on the other hand, the discrete time channel impulse response is extended to introduce energy at a number of symbol times. The effect of the channel on the transmitted signal, in turn, may be viewed as the convolution of the transmitted information with the channel's impulse response. The channel, therefore, emulates a convolutional coding process (encoder).

This leads to the possibility of estimating the transmitted information through the use of methods analogous to typical decoding of convolutional codes, i.e., maximum likelihood sequence estimation techniques. Unlike the more widely applied forward error correction decoding environment, the details of the encoding process in a reverse error correction decoding environment, are not known a priori by the receiver. Issues related to the need to estimate the form of the encoding process are addressed by this invention.

For the North American digital cellular system, a number of documents define the standards of implemented components. With respect to this invention, the following are of interest: "Dual-Mode Mobile Station-Base Station Compatibility Standard" denoted here as IS-54, EIA/TIA Project Number 2398, Rev. A January, 1991 and "Recommended Minimum Performance Standards for 800 MHz Dual-Mode Mobile Stations", denoted here as IS-55, EIA/TIA Project Number 2216, April, 1991.

Doppler shift, where a frequency of a received signal is either increased or decreased relative to a frequency of the signal when it is transmitted, is due to relative motion between a transmitter and a receiver. The amount of Doppler shift varies as a function of the speed and direction (i.e., velocity) of the relative motion. Because a channel's phase is related to the Doppler shift, the rate at which the channels phase varies is a function of the relative velocity. When the relative velocity has a low speed, the rate of change in the channel is slower than when the relative velocity has a high speed. Thus, because noise, carrier frequency mismatch, and other effects inhibit channel estimation, channel estimation can be more accurate at slow relative velocity than at high relative velocity. This is due to the ability to perform such estimation over a greater period of time by averaging the received signal. When the relative velocity is high, such averaging must be performed over a much shorter period of time due to the rapid changes that are occurring in the channel (because older channel estimate information is not relevant to the changed channel). Typically, however, receivers, such as cellular telephone receivers, which are designed for use when there is some relative velocity between the receiver and a transmitter, are designed to estimate the channels phase at high relative velocity. Thus, the advantages of enhanced noise and carrier frequency mismatch tolerance, which are gained by averaging over greater periods of time, are sacrificed so that channel estimation can be performed quickly at high relative velocity.

It is therefore desirable to provide an enhancement in communications channel estimation, wherein the advantages of channel estimation at slow speed are gained, while providing rapid, albeit less accurate, estimation at high speed.

Thus, what is needed is a communications system that provides for adaptable channel estimation based on relative velocity between the receiver and transmitter, i.e., based on Doppler bandwidth. Such communications system should be able to adapt the channel estimation as a function of the relative velocity.

The present invention advantageously addresses the above and other needs.

SUMMARY OF THE INVENTION

The present invention advantageously addresses the needs above as well as other needs by providing a device and method for Doppler bandwidth estimation in a communications channel, and for adaptation of a receiver equalizer based on such estimation.

The invention can be characterized as a method for adjusting an equalizer in response to a relative velocity between the communications receiver and a communications transmitter. The method includes (a) receiving a radio frequency signal through a communications channel into the communications receiver from the communications transmitter, and (b) digitizing a first portion of the radio frequency signal during a first time period and, in response to such digitizing, generating a first data signal, which comprises samples. The method also includes (c) estimating characteristics of the communications channel in response to a portion of the first data signal, and, in response thereto, generating a first channel estimate. Next, the method includes (d) digitizing a second portion of the radio frequency signal during a second time period and, in response thereto, generating a second data signal, which comprises samples. The method further includes (e) determining an estimated velocity of the communications receiver relative to the communications transmitter, and (f) weighting the first channel estimate in response to the estimated velocity. Finally, the method includes (g) generating a revised channel estimate in response to the weighting of the first channel estimate, and in response to the second data signal.

It should be understood that the first channel estimate can, in practice, be generated in response to the portion of the first data signal in addition to a plurality of other portions of the first and/or other data signals and can in effect be a running average estimate of the channel.

The invention can also be characterized as a digital communications receiver for adjusting an equalizer in response to a relative velocity between the communications receiver and a communications transmitter. The digital communications receiver has a radio frequency receiver that receives a radio frequency signal from the communications transmitter through a communications channel, and an analog to digital converter coupled to the receiver. The analog to digital converter converts first and second portions of the radio frequency signal during first and second time periods and, in response thereto, generates first and second data signals, which comprise samples. A channel estimator is coupled to the analog to digital converter, and estimates characteristics of the communications channel in response to a portion of the first data signal, and in response to a portion of the second data signal. The channel estimator generates first and second channel estimates, respectively, in response to the estimated characteristics.

The communications receiver also includes a processor that is coupled to the channel estimator. The processor determines an estimated velocity of the communications receiver relative to the communications transmitter, and weights the first channel estimate relative to the second channel estimate in response to the estimated velocity. Finally, the processor generates a revised channel estimate in response to the weighting of the first channel estimate.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
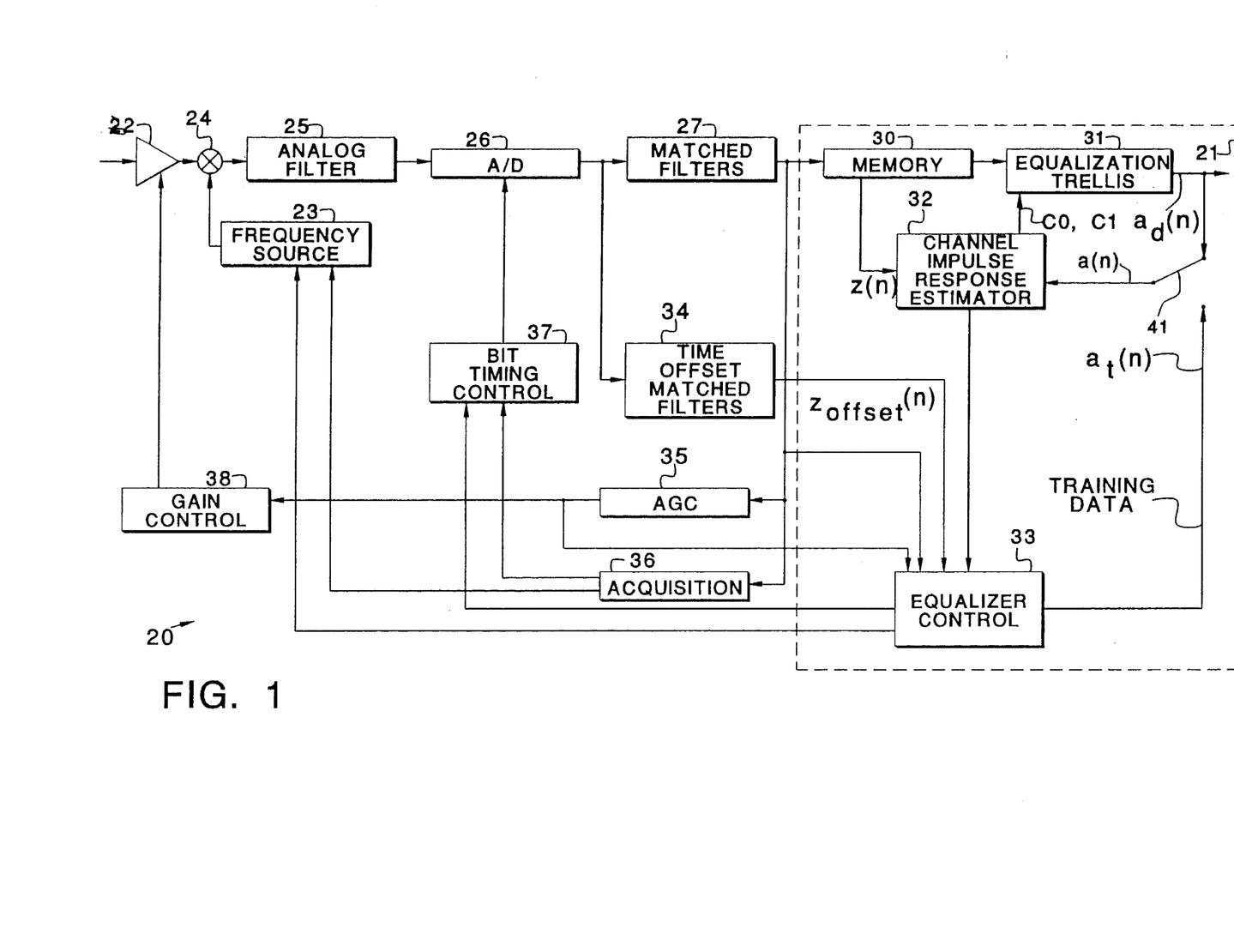
FIG. 1 is a block diagram of an embodiment of an device made in accordance with the present invention.

Referring first to FIG. 1, a block diagram is shown of an embodiment of an apparatus made in accordance with the present invention. A digital cellular mobile telephone system 20 comprises an amplifier 22 whose output is coupled by way of a downconverter, comprising a frequency source 23 and a mixer 24, to an analog filter 25. An analog to digital converter 26 is coupled to the analog filter 25 in order to digitize the downconverted data. A matched filter 27 is coupled between the analog to digital converter 26 and equalizer 21 of the present invention. The equalizer 21 comprises a memory 30, a 4-state equalization trellis 31 that is adapted to calculate maximum likelihood sequence estimation metrics, a channel impulse response estimator 32, and an equalizer control circuit 33.

A serially coupled AGC circuit 35 and gain control circuit 38 are coupled to the amplifier 22. The equalizer control circuit 33 is coupled to an output of the matched filters 27 and is coupled to an output of the matched filters 27 and is coupled to an input to the frequency source 23. Symbol sampling (bit timing) time control circuitry 37 is coupled to the equalizer control circuit 33 and the acquisition circuit 36 and provides control signals to the analog to digital converter 26. The output of the matched filters 27 is coupled to the AGC circuit 35 and the acquisition circuit 36 and to the equalizer control circuit 33 and the acquisition circuit 36 and provides control signals to the analog to digital converter 26. The output of the matched filters 27 is coupled to the AGC circuit 35 and the acquisition circuit 36 and to the equalizer control circuit 33 that is employed to control the frequency source 23 and provide training data for use in initializing the equalizer 21.

In operation, a partially filtered intermediate frequency (IF) signal with a center frequency of 85.05 MHz enters the gain controllable amplifier 22. The resulting signal is then downconverted using the frequency source 23 and the mixer 24 to 461.7 kHz. This signal is then filtered using a narrow analog filter 25 to reject most of the received signals outside the 30 kHz band of interest. The resulting signal is then sampled and converted to 8-bit digital samples using the analog to digital (A/D) converter 26. A 16 tap fractionally spaced digital FIR filter 27 then performs matched filtering to produce symbol spaced samples which enter the equalizer 21. Temporally offset matched filters 34 that are substantially the same as the matched filters 27 are provided for use by the symbol timing control circuit 37, via the equalizer control circuit 33.

The principles of maximum likelihood sequence estimation employed in the equalizer 21 have been described in technical literature starting in the early 1970's. A useful outline is found in "Adaptive Maximum-Likelihood Receiver for Carrier-Modulated Data Transmission Systems", by G. Ungerboeck, IEEE Trans. on Communications, Vol. COM-22, pp. 624–636, May, 1974. Another description of the maximum likelihood sequence estimation technique is provided in the reference "Digital Communications, 2nd Edition", by J. G. Proakis, 1980, pp. 610–642, 1989.

The embodiment described herein makes use of an adaption of the Maximum Likelihood Sequence Estimation (MLSE) equalizer described in U.S. Pat. No. 5,263,026, incorporated herein by reference. Various aspects of the '026 patent MLSE equalizer are outlined and explained herein with respect to the particular adaptation of the '026 patent utilized to implement a preferred embodiment of the present invention.

Figure 2:
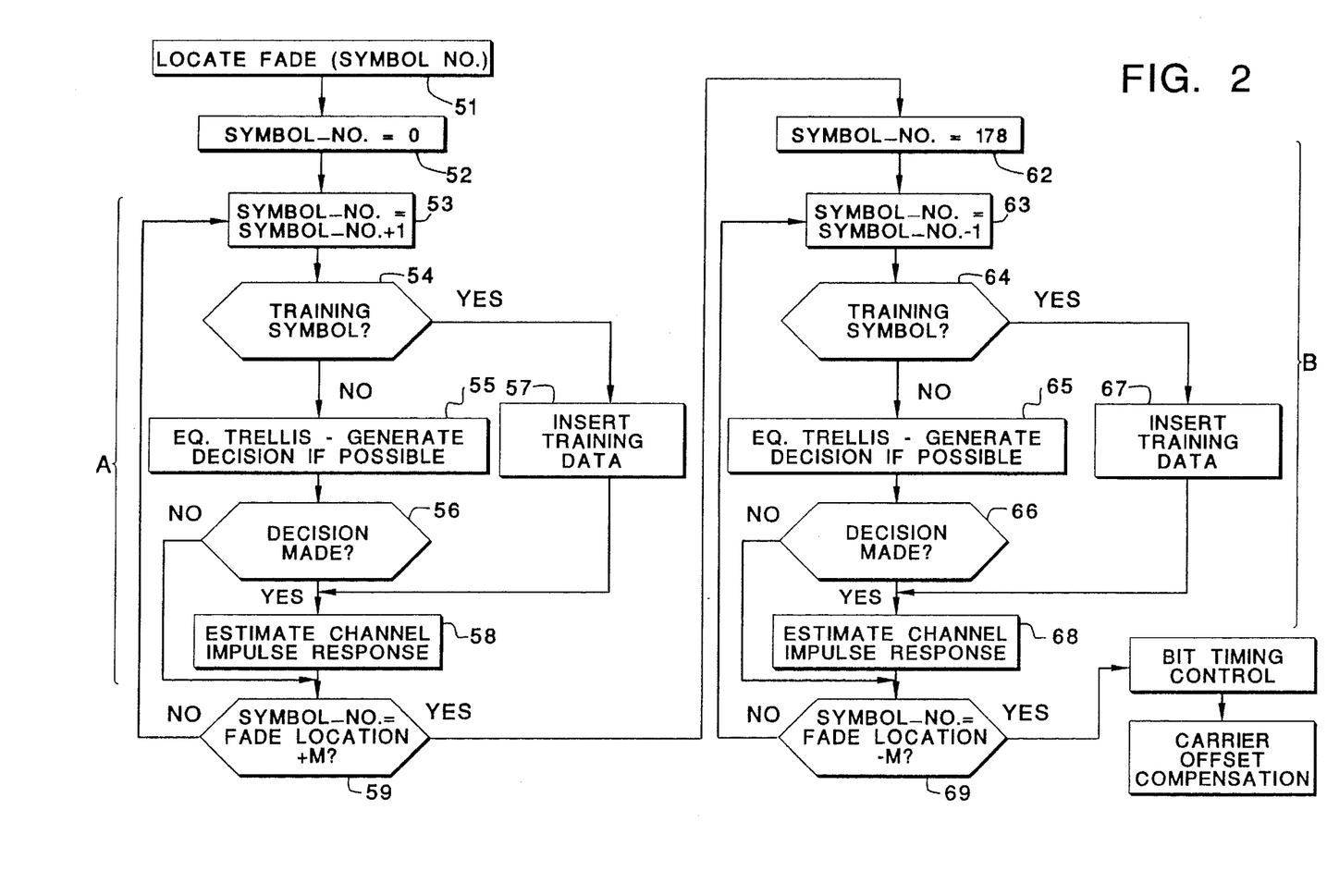
FIG. 2 is a flow chart of the steps traversed by a maximum likelihood sequence estimation equalizer that can be used with the embodiment of FIG. 1.

More specifically, FIG. 2 shows the processing performed in the maximum likelihood sequence estimation based equalizer 21 of FIG. 1. The first step involves finding the location of the power fade (box 51) in terms of symbol number. Processing starts in the forward direction toward the location of the power fade. The symbol number is set to 0 (box 52), and then incremented (box 53). A decision is made whether the symbol then processed is a training symbol (box 54). If the symbol encountered is a training symbol, then training data is inserted (box 57). If a training symbol is not processed, then the equalization trellis is employed to generate metrics and, if possible, a decision (box 55). This is accomplished using equations outlined below. Then it is determined if a decision has been made (box 56). If a decision has been made, then an estimate of the channel impulse response is generated (box 58). If the decision is not made, or once the channel impulse response estimate has been generated, then the symbol number is compared to the location of the power fade plus a predetermined number of additional symbols (box 59). Processing is then repeated by incrementing the symbol number (box 53) and repeating steps (boxes 54–59) until the fade location plus a predetermined number of additional symbols has been reached.

Once the desired symbol location is reached in (box 59), then processing is performed in the reverse direction starting with the preamble of the next succeeding time period, namely symbol number 177, for example. The symbol number is set to 178 (box 62), and then decremented (box 63). A decision is made whether the symbol then processed is a training symbol (box 64). If the symbol encountered is a training symbol, then training data is inserted (box 67). If a training symbol is not processed, then the equalization trellis is employed to generate branch metrics and a decision (box 65). This is accomplished using the equations outlined below. Then it is determined if a decision has been made (box 66). If a decision has been made then an estimate of the channel impulse response is generated (box 68). If the decision is not made, or once the channel impulse response estimate has been generated, then the symbol number is compared to the location of the power fade less a predetermined number of additional symbols (box 69). Processing is then repeated by decrementing the symbol number (box 63) and repeating steps (boxes 64–69) until the fade location less a predetermined number of additional symbols has been reached.

More particularly, and in operation, samples entering the equalizer 21 may be identified as $z(n)$, and the output decisions may be identified as $a(n)$. The probability of correctness of $a(n)$ is known with certainty the values of $a(n)$, denoted $a(n)$, are used by the channel impulse response estimator 32 for training. At other times, the best estimate of $a(n)$ is the output of the traceback decision process of the equalization trellis 31, denoted $ad(n)$.

The equalization trellis 31 operates as follows. Equalization proceeds in the forward direction from the beginning of the preamble up until M symbols after the minimum power symbol. In the reverse direction, the same occurs with processing continuing M symbols beyond the minimum power point. This overlap ensures that trace-back through the trellis in all likelihood converges to a single path by the minimum power point.

Traceback for actual decisions does not occur until the completion of the equalization process. In addition to final traceback, however, there is a need for tentative decisions during equalization, to provide data estimates for the channel impulse response estimation to remain current. A trade-off in determining these tentative decisions arises (a) because the more up-to-date the information is, the more up-to-date the channel impulse response estimate can be (remembering that the channel is far from stationary at high speeds), and (b) the higher the number of symbols that are considered before tentative decisions are made, the more accurate the decisions will be and hence, the lower the probability that errors are introduced into the channel impulse response estimation. In the case of 4-state equalization, the constraint length is so short that accurate tentative decisions are possible without excessive delay.

Branch metrics are calculated in the equalizer 21 using the following equation:

$$br \text{ metric}[z(k), app \text{ state}(1)] = |z(k) - \sum_{n=0}^{1} C_N(k) \times a_h(1,n)|^2$$

where app_state (1) represents a hypothetical state in combination with potential input data; $ah(1,n)$ is corresponding transmitted signal (constellation point), C represents the current estimate of the channel's impulse response, and z is the measured output of the matched filter 27.

The channel estimator 32 utilizes a second order least mean square algorithm to determine the coefficients of the transversal filter 27 that is an estimate of the channel.

$$C_{S0}(k+1) = C_{S0}(k) + K_1\left[z(k) - \sum_{n=0}^{1} C_n(k) \times a(k-n)\right] a^*(k)$$

$$C_{S1}(k+1) = C_{S1}(k) + K_1\left[z(k) - \sum_{n=0}^{1} C_n(k) \times a(k-n)\right] a^*(k-1)$$

$$C_0(k+1) = C_0(k) + C_{S0}(k+1) + K_2\left[z(k) - \sum_{n=0}^{1} C_n(k) \times a(k-n)\right] a^*(k)$$

$$C_1(k+1) = C_1(k) + C_{S1}(k+1) + K_2\left[z(k) - \sum_{n=0}^{1} C_n(k) \times a(k-n)\right] a^*(k-1),$$

where $C_0(k)$ and $C_1(k)$ are complex values of estimated channel impulse response taps, $C_{S0}(k)$ and $C_N(k)$ are complex intermediate values related to the estimated channel impulse response taps, permitting second order operation, $K_1$ and $K_2$ within these equations control the rate of adaptation, and (conversely) the sensitivity to noise and decision errors. Consequently, to minimize the error rate, a trade-off between ability to track changes in the channel and degradation in performance due to imperfect input information is needed to optimize the values of $K_1$ and $K_2$. The optimal values of $K_1$ and $K_2$ vary as a function of instantaneous signal to noise ratios, and thus as a function of depth of fade. Therefore, various approaches to modifying the values during each burst have been evaluated, with considerable improvement in performance relative to that achievable with constant settings.

One approach for modifying $K_1$ and $K_2$ provides good performance and is as follows:

1. Set the values of $K_1$ and $K_2$ that will apply at the symbol determined to correspond to the deepest fade; $K_1\_fade$.

2. Adjust each value linearly (with preset slope—$K_1\_slope$ and $K_2\_slope$) to reach the selected values at the fade location, using:

before forward processing—initialize
$K_1=K_1\_fade—K_1\_slope$, fade_location
$K_2=K_2\_fade—K_2\_slope$, fade_location before forward processing—initialize
$K_1=K_1\_fade - K_1\_slope$, (177 - fade_location)
$K_2=K_2\_fade - K_2\_slope$, (177 - fade_location)

during processing—as each symbol is processed
$K_1=K_1+K_1\_slope$
$K_2=K_2+K_2\_slope$ where $K_1\_fade$ is the real value of $K_1$ at the symbol with the maximum estimated fade depth, $K_2\_fade$ is the real value of $K_2$ at the symbol of maximum estimated fade depth, $K_1\_slope$ is the real increment in $K_1$ applied during processing of each symbol, $K_2\_slope$ is the real increment in $K_2$ applied during processing of each symbol, and fade_location is the symbol number at the maximum estimated safe depth, and last_location is the symbol number of the final symbol.

Estimation of the location of the power fade entails use of the received symbols from the matched filter 27, and the settings on the AGC circuit 35 that were active during reception of those symbols. As the response of the amplifier 22 to the AGC circuit settings is effectively instantaneous, the primary delays in utilizing this information arise in the matched filter 27. This filter 27 is a linear phase filter (constant delay), so that available input information can be easily transformed into an accurate estimate of the envelope power. This envelope is averaged by a rectangular FIR filter over about ten symbol times, with very good performance.

After completion of acquisition, the carrier frequency offset should be less than 200 Hz. To operate without impairment, this offset should be on the order of 20 Hz or less. Thus, estimation of and correction for carrier offset must continue after acquisition. The method employed utilizes the fact that when frequency offset occurs, the taps of the channel impulse response will rotate consistently at a rate proportional to the offset. Changes in tap phases over fixed periods, therefore, provide an observable characteristic to apply to frequency control. Note that random phase changes occur, in addition to these consistent rates of change, so filtering is used to extract the frequency offset. In practice, offsets of around 1000 Hz can be resolved although the maximum expected offset after acquisition is 200 Hz. The approach used is as follows:

1. During the reception of each burst, the half of that burst that does not include the deepest fade is selected for tracking. This scheme is aimed at avoidance of the very high rates of change in phase that typically accompany transitions through low signal amplitudes.

2. Two samples of each of the two estimated channel impulse response taps are recorded: just after the preamble (or leading into the postamble if the fade occurred during the first half of the period), and 20 symbols later (or 20 symbols earlier). At a symbol rate of 24,300 symbols per second, a 100 Hz offset would result in an average rotation of 29.6 degrees during the 20 symbol period. For any rotation in excess of 180 degrees, the observed rotation would be less than 170 degrees but in the opposite direction. This aliasing could impact performance of frequency offsets above about 300 Hz. In typical operation, however, the detriment to performance resulting from such aliasing has proved minimal, due to the anti-aliasing filtering inherent in the tracking. The selection of a sampling window of 20 symbols was based on concern about this aliasing. Otherwise, a longer window would improve noise immunity.

3. From information determined during the bit timing fine tuning, the dominant tap is selected. Using the recorded settings for this tap, a phase change is calculated, yielding an estimate of the frequency offset.

4. These estimates are then filtered over many bursts to reduce the "noise" that arises primarily due to the random (zero mean) presence of Doppler offsets and Gaussian noise. The filter output provides an estimate of the carrier offset and can be used to directly update the frequency control hardware. The offset is given by:

$$f\_offset\_estimate K+1= (1-Kf_o\_offset\_estimate K+Kf_o \text{freq\_observed}$$

where freq_observed is derived from the observed phase change, the constant $Kf_o$ controls the convergence rate of the estimation process, f_offset_estimate k is the estimated frequency offset at frame "k" and $Kf_o$ is a constant controlling the convergence rate of the frequency tracking. F_offset_estimate reaches half the resolution of the frequency source, then a step in frequency is applied, e.g., if the resolution is 20 Hz and f_offset_estimate exceeds 10 Hz, then a 20 Hz change in reference is applied. At the same time f_offset_estimate is reinitialized.

As an addition to the above approach for modifying $K_1$ and $K_2$, the following modification to $K_1$ and $K_2$ advantageously provides for speed dependent tracking based on Doppler bandwidth. The values of $K_1$ and $K_2$, respectively, determine the degree to which the channel tap estimates $C_0$ and $C_1$ are dependent on recent input information. When the transmission channel is relatively stable, the recent input information should be weighted lightly to minimize the effect of, e.g., noise or carrier frequency error. When, however, the channel is dynamic, the recent input information should be weighted more heavily, so that the equalizer is able to adapt to rapidly changing channel characteristics. Thus, the optimum values of $K_1$ and $K_2$ are dependent on the channel's characteristics.

One factor that affects channel characteristics is the relative velocity between the base station and the mobile unit, i.e., between a communications receiver and a communications transmitter. Typically this velocity is due to the movement of a vehicle in which the mobile unit is mounted. The base station is typically located at a fixed land sight. Note, however, that this speed dependent tracking approach works equally well if the base station (or communications transmitter) is mobile, in addition to or instead of the mobile unit (or communications receiver).

In a typical case, as the vehicle, and therefore the mobile unit, increases in velocity relative to the base station, the channel becomes more dynamic. Thus, as the vehicle increases in velocity, the optimum values of $K_1$ and $K_2$ should be adjusted to weight the recent information heavily, i.e., $K_1$ and $K_2$ should be increased. Similarly, as relative vehicle velocity decreases, $K_1$ and $K_2$ should be decreased so as to decrease the weight given to the recent input information.

A preferred way of adjusting the value of $K_1$ and $K_2$ includes selecting first values for $K_1$ and $K_2$ in response to a detected vehicle relative velocity that is in excess of a prescribed threshold, e.g., 3 to 5 miles per hour, and selecting second values for $K_1$ and $K_2$ in response to detected vehicle velocity that is below the prescribed threshold.

The relative velocity, or speed, of the vehicle is evident in the dynamics of the channel characteristics, and therefore the dynamics of the channel characteristics can be used to detect the relative velocity. Specifically, the Doppler bandwidth of the fading pattern of the radio frequency signal (or radio signal) is indicative of the dynamics of the channel's characteristics and, in turn, of the vehicle's speed.

Doppler bandwidth can be detected in a number of ways. In a preferred embodiment, the rate of random, i.e., not consistent, rotation within the complex plane of the complex channel tap estimates $C_0$ and $C_1$ is indicative of Doppler bandwidth, and hence vehicle speed. Consistent rotation, as described above, is indicative of frequency error in the down conversion of the radio frequency signal. Frequency error is preferably, however, compensated for using a feedback loop that has a much greater bandwidth, i.e., shorter correction time, than the loop that is used to estimate vehicle speed (Doppler bandwidth). Thus, frequency error, having been quickly compensated for, is ignored in evaluating vehicle speed.

Two sets of channel impulse response estimates, i.e., the tap setting phases $\phi_1, \phi_2$, are recorded. The first corresponds to a number of symbols at some predetermined point in the signal burst and the second to a point, e.g., twenty symbols later. The phases $\phi_1, \phi_2$ of the channel impulse response estimates are recorded. Each of the channel impulse response estimates is averaged over a prescribed number of symbols to reduce the effect of noise therein. The difference $\Delta\phi=|\phi_1-\phi_2|$ provides a measure of vehicle speed, as follows:

$$\text{Speed\_estimate}=(1-K_s)\text{Speed\_estimate}+K_s \Delta\phi,$$

where $K_s$ is a filtering constant that is used to smooth channel tap estimates. The optimal value of $K_s$ is a monotonically increasing function of Speed_estimate, however, in practice $K_s$ is preferably set to a constant value.

Figure 3:
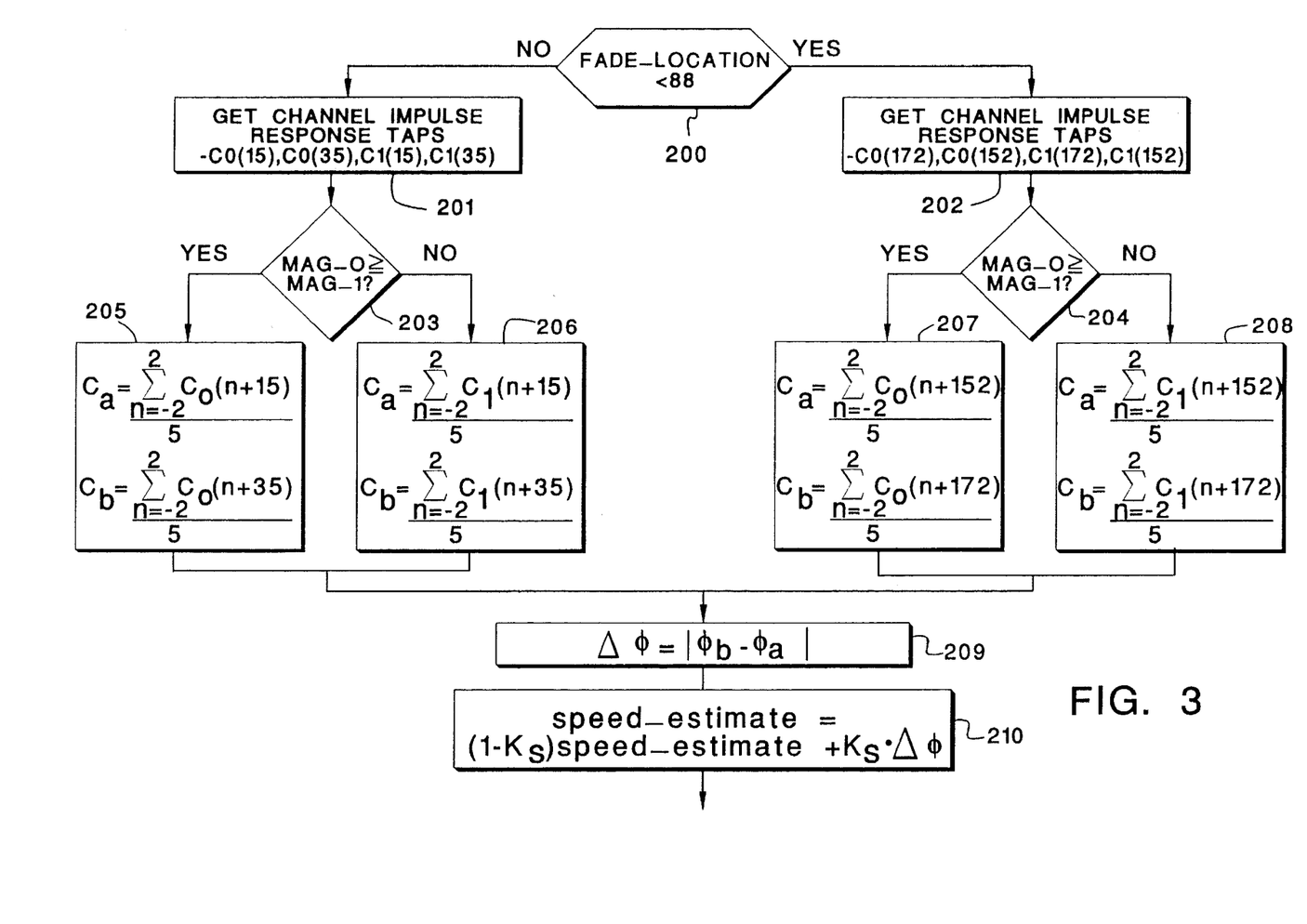
FIG. 3 is a flow chart of the steps traversed by the device of FIG. 1 in order to generate a speed estimate.

A flow chart is shown in FIG. 3 of the steps traversed to generate the speed estimate. Utilizing an already located fade, a decision (box 200) is made as to whether to use the first or second half of the received slot for speed estimation. Based on this decision, samples are taken twenty symbols apart in the appropriate half of the period (boxes 201, 202). For the selected case, individual channel tap estimates $C_0$, $C_1$ are compared and the larger is chosen (decisions 203, 204). Channel tap averages $C_a$, $C_b$ are then generated (boxes 205, 206, 207, 208) based on the chosen channel tap estimate (either $C_0$ or $C_1$). The channel tap averages $C_a$, $C_b$ are based on averages of the chosen channel tap estimate at two points (which are twenty symbols apart) within the first or second half of the received slot. The averages are taken over five symbols centered at the two points. The phases $\phi_a$, $\phi_b$ (or $\phi_1, \phi_2$) of the channel tap averages $C_a$, $C_b$, i.e., the average tap setting phases $\phi_a$, $\phi_b$ at the selected two points are then subtracted (box 209) to produce a phase difference $\Delta\phi$, which is used (box 210) to generate the measure of vehicle speed as described above, that is: Speed_estimate= $(1-K_s)$Speed_estimate+$K_s \Delta\phi$, which is iteratively generated.

Note that no accounting is made for frequency offset, because any frequency offset is preferably compensated for (using the steps shown in FIG. 4) before the speed estimate is generated. In other embodiments, however, frequency offset may be accounted for as a part of the speed estimate determination.

In this way $K_1$ and $K_2$ are adjusted in response to vehicle speed, so as to optimally adjust the channel tap estimates to be more dependent on recently received information when the vehicle is at high speed relative to the base station and to be less dependent on recently received information, and thus less susceptible to the effects of noise, when the vehicle is at low speed relative to the base station.

Figure 4:
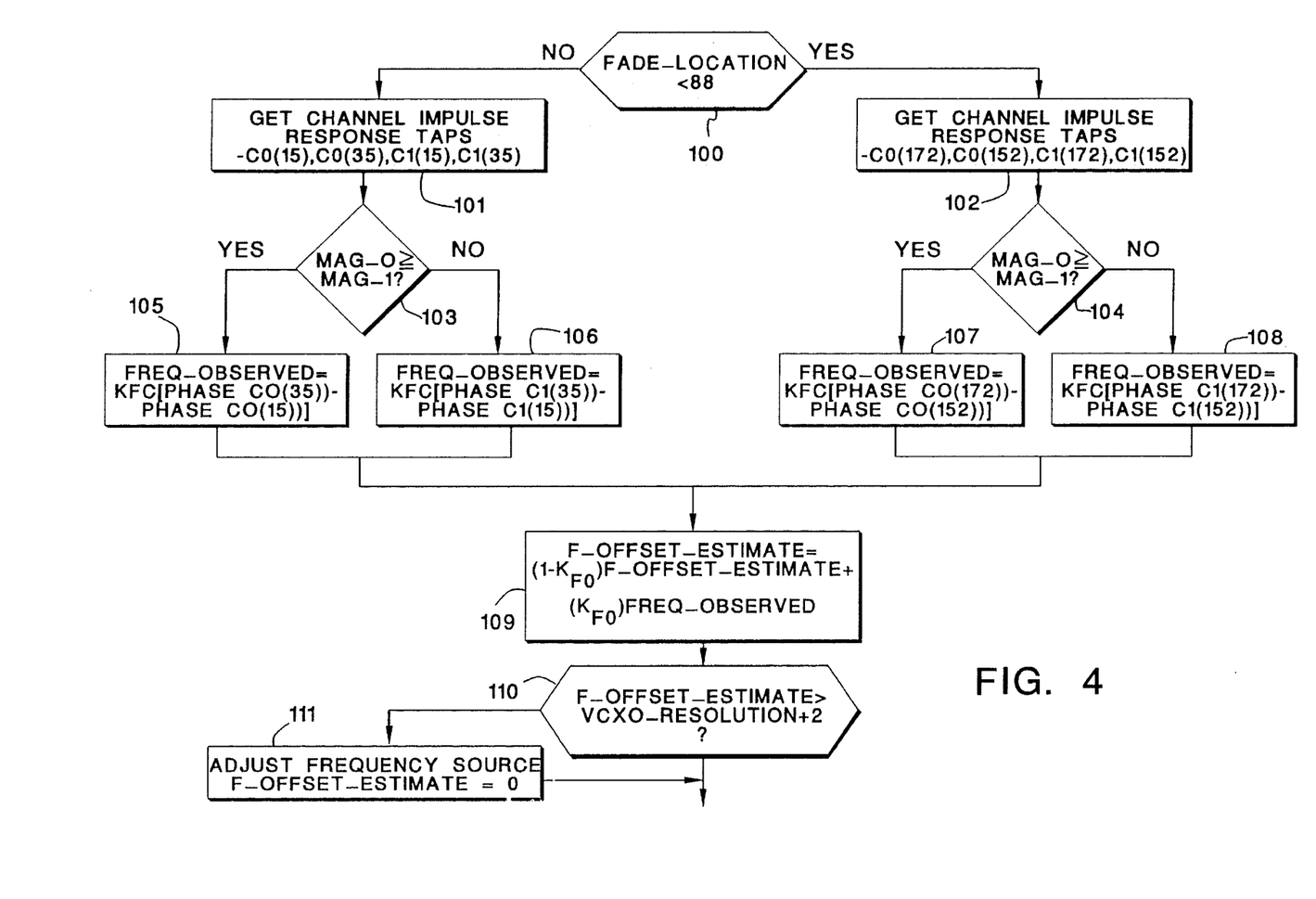
FIG. 4 is a flow chart of the steps traversed by the maximum likelihood sequence estimation equalizer of FIG. 2 in order to implement carrier frequency offset compensation.

Referring to FIG. 4, a flow diagram is shown of the processing performed by the equalizer 21 to implement carrier frequency offset compensation. As mentioned above, such carrier frequency offset compensation is carried out before the speed estimate is taken so as to avoid the need for carrier frequency offset compensation as a part of the speed estimate. Utilizing an already located fade, a decision (box 100) is made as to whether to use the first or second half of the received period for frequency offset estimation. Based on this decision, samples are taken twenty symbols apart in the appropriate half of the period (boxes 101, 102). For the selected case, individual taps are compared and the larger is chosen (decisions 103, 104). The phases of the chosen tap at the selected two times are then subtracted (boxes 105-108) to produce "freq_observed", a noisy estimate of the offset. This is filtered (box 109) to generate an accurate estimate of the offset. If an adjustment in setting of the frequency control would reduce this offset, then a decision is made to do so (decision 110); and the decision is then implemented (box 111).

The equalizer 21 is reasonably insensitive to errors in bit timing. However, for the following reasons, symbol timing adjustments continue during equalizer operation. The initial estimate produced by acquisition may differ sufficiently from optimal timing so that performance would benefit from adjustment. The transmit and receive symbol timing clocks may differ by about 5 ppm, resulting in drift of about 0.1 μs per frame (per a symbol every 8 seconds). This drift must be compensated for. In practice, individual independently-delayed signal paths will randomly rise and diminish in average strength, resulting in situations that would be best catered for by different symbol timing. Optimal symbol timing depends on an ability to track these changing situations.

The operation of the symbol timing control is as follows. The approach has similarities to the early-late gating schemes frequently employed in direct-sequence spread spectrum receivers. As each burst is received, a measure of the error between the expected preamble and the actual received preamble is generated. In addition, in alternating frames, similar measures are made on time advanced and retarded versions of the same input samples. If no timing adjustment is necessary, the error generated with the existing timing should be less (on average) than either of the others. Adjustments are made when this is not the case or there is a consistent disparity between the advanced and retarded error estimates. This process is simply a search for bit timing that minimizes the error statistic.

The control loop used includes an estimator of any consistent change in timing, corresponding to drift with respect to the transmitter. Drift in the order of 10 ppm can be compensated for by this loop.

This search for a minimum may be hampered by the possible presence of a local (non-global) minimum. In fact, for this statistic the presence of two minima is common. The approach taken to resolve this conflict is as follows. The more advanced minimum is presumed to be the preferred sampling time. Multiple minima typically arise when there is a small level of delay spread, i.e., less than about 10 μs such conditions the ratio of magnitudes of the estimated paths in the (symbol-spaced) channel impulse response differs significantly in the region of the more advanced minimum from that in the more retarded case. Thus, the ratio of tap magnitudes provides a statistic from which to conclude the appropriateness of a selected minimum.

Figure 5A:
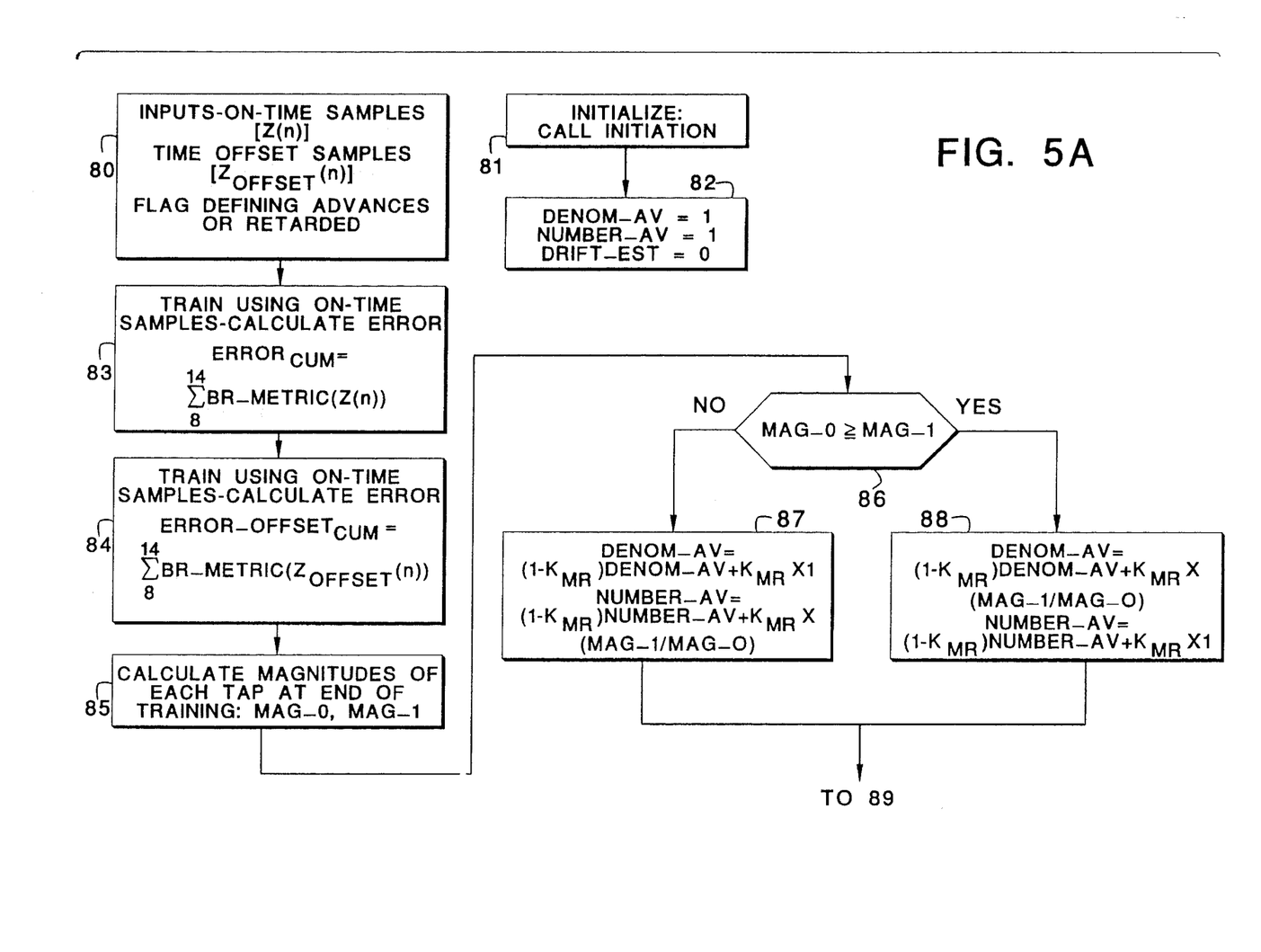
FIGS. 5A and 5B are flow charts of the steps traversed by the maximum likelihood sequence estimation equalizer of FIG. 2 in order to implement bit timing.
Figure 5B:
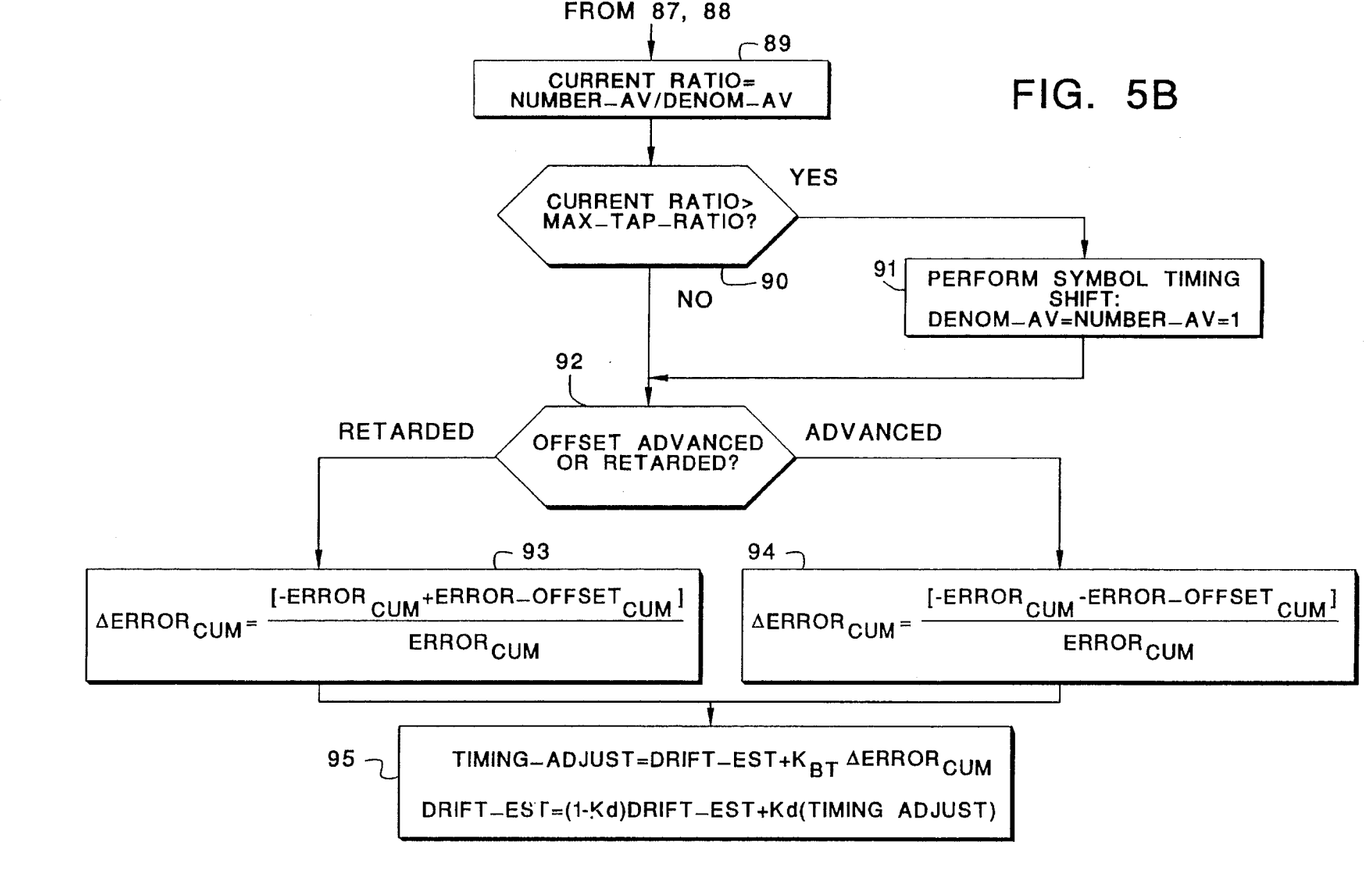

With reference to FIGS. 5A and 5B, they show flow diagrams illustrating the processing performed by the equalizer 21 to implement bit timing control. Inputs (ox 80) include the on-time and time-offset samples (z(n) and z offset (n)), and a flag to indicate the direction of the offset. The on-time samples are fed into the equalizer 21 just as they are during normal training 83. Similarly, the time offset samples are fed to the equalizer 21 (box 84). In both cases, the branch metrics (on the known correct paths) are accumulated over the latter symbols to provide measures (ERRORcum and ERROR OFFSETcum) of the degree to which the samples match expectations.

In a separate process the magnitudes of each of two taps estimated and the channel impulse response at the end of the training process are calculated (box 85). Averaging the ratio of these taps over a number of frames (boxes 86–89) permits a judgment to be made as to whether the bit timing has selected an inappropriate local minimum. If a threshold (box 90) is reached, then bit timing will be advanced by a full symbol time (box 91). Taking account of the relative time at which samples were taken (box 92), the $ERROR_{cum}$ and $ERROR\ OFFSET_{cum}$ measures are combined to generate a noisy estimate of an appropriate timing adjustment (boxes 93, 94). This estimate is then filtered (box 95) to generate an actual timing offset adjustment. To compensate for consistent drift, an additional term "drift_est" monitors and compensates for this effect.

While the invention herein disclosed has been described by means of specific embodiments and applications thereof, numerous modifications and variations could be made thereto by those skilled in the art without departing from the scope of the invention set forth in the claims. For example, the equalizer 21 need not be a maximum likelihood sequence estimation based equalizer, but may be any of a number of known types of equalizers, e.g., linear equalizers and decision feedback equalizers (DFEs). It should also be understood that the present invention can be used with a non-equalizing receiver, i.e., where only a single tap is used, and therefore only one channel tap estimate $C_0$ is utilized.

What is claimed is:

1. In a digital communications receiver, a method for adjusting an equalizer in response to a relative velocity between the communications receiver and a communications transmitter, the method including:

receiving a radio frequency signal from the communications transmitter through a communications channel into the communications receiver;

digitizing a first portion of the radio frequency signal during a first time period and generating a first data signal, which comprises samples, in response thereto;

estimating characteristics of the communications channel in response to a portion of the first data signal, and generating a first channel estimate in response thereto;

digitizing a second portion of the radio frequency signal during a second time period and generating a second data signal, which comprises samples, in response thereto;

determining an estimated velocity of the communications receiver relative to the communications transmitter;

weighting the first channel estimate in response to the estimated velocity;

generating a revised channel estimate in response to the weighting of the first channel estimate and in response to the second data signal.

2. The method of claim 1 further including:

digitizing a third portion of said radio frequency signal during a third time period and generating a third data signal, which comprises samples, in response thereto, said second time period being after said first time period, and the third time period being after said second time period;

determining a reestimated velocity of said communications receiver relative to said communications transmitter;

weighting said revised channel estimate in response to the reestimated velocity;

generating a rerevised channel estimate in response to the weighting of said revised channel estimate, and in response to the third data signal.

3. The method of claim 2 wherein said estimating of said characteristics of said communications channel in response to said portion of said first data signal includes:

storing time sequentially samples received during the first time period;

processing the samples received during the first time period, having been stored, starting with a first received sample in the first time period, and storing in a forward sequence with respect to time beyond a most probable error location, using a preselected maximum likelihood sequence estimation procedure to generate one group of estimates of said radio frequency signal;

processing the samples received during the first time period, having been stored, starting with a last received sample in the first time period, and storing in a reverse sequence with respect to time beyond the most probable error location, using the preselected maximum likelihood sequence estimation procedure to generate another group of estimates of said radio frequency signal; and processing the one and the other groups of estimates of the radio frequency signal to generate enhanced estimates of said radio frequency signal.

4. The method of claim 3 wherein said processing of said one and said other groups of estimates includes:

generating transmission channel impulse response estimates.

5. The method of claim 4:

wherein said generating of transmission channel impulse response estimates includes:

estimating tap settings for said estimated channel impulse response including determining a first variable tap coefficient and a second variable tap coefficient by minimizing the square of the difference between samples within the first data signals, and samples that are synthesized by passing known transmitted signals through an estimated channel having said estimated channel impulse response, wherein the estimating of tap settings is iterative, and combining a first transmission channel impulse response estimate with a second transmission channel impulse response estimate; and wherein said weighting of said first channel estimate includes:

varying a ratio of contributions from the first transmission channel impulse response estimate and the second transmission channel impulse response estimate in combining the first transmission channel impulse response estimate with the second transmission channel impulse response estimate.

6. The method of claim 5 wherein said estimating of tap settings for said estimated channel impulse response includes determining said first variable tap coefficient and said second variable tap coefficient, said first variable tap coefficient and said second variable tap coefficient being complex values.

7. The method of claim 6 wherein said determining of said estimated velocity of said communications receiver relative to said communications transmitter includes:

determining whether said most probable error location is in a first half of said first data signal;

selecting the first half of said first data signal in the event said most probable error location is not in the first half of said first data signal;

selecting a second half of said first data signal in the event said most probable error location is in the first half of said first data signal;

generating a first tap setting phase in response to samples within the first half of said first data signal in the event the first half of said first data signal is selected;

generating a second tap setting phase in response to samples within the first half of the said first data signal in the event the first half of said first data signal is selected, said second tap setting phase being generated in response to samples that follow samples in response to which said first tap setting phase is generated;

generating the first tap setting phase in response to samples within the second half of said first data signal in the event the second half of said first data signal is selected;

generating the second tap setting phase in response to samples within the second half of said first data signal in the event the second half of said first data signal is selected; and determining a difference in phase over time in response to said first tap setting phase and said second tap setting phase.

8. The method of claim 7 wherein said determining of said estimated velocity of said communications receiver relative to said communications transmitter further includes:

determining whether said first variable tap coefficient is greater in magnitude than said second variable tap coefficient;

said generating of said first tap setting phase and said generating of said second tap setting phase being in response to said first variable tap coefficient in the event said first variable tap coefficient is greater in magnitude than said second variable tap coefficient; and said generating of said first tap setting phase and said generating of said second tap setting phase being in response to said second variable tap coefficient in the event said first variable tap coefficient is not greater in magnitude than said second variable tap coefficient.

9. The method of claim 8 wherein said determining of said estimated velocity of said communications receiver relative to said communications transmitter includes iteratively determining:

$$\text{Speed\_estimate}(t+1) = (1-K_s)\text{Speed\_estimate}(t) + K_s\Delta\phi$$

wherein is said difference in phase over time, $K_s$ is a filtering constant for smoothing said estimated velocity, and t represents a time of a previous iteration, Speed_estimate(t) being a previous velocity estimate determined at the time of the previous iteration, and Speed_estimate(t+1) being a present velocity estimate, said estimated velocity being equal to the present velocity estimate after a preselected number of iterations.

10. A digital communications receiver for adjusting an equalizer in response to a relative velocity between the communications receiver and a communications transmitter, the digital communications receiver including:

means for receiving a radio frequency signal from the communications transmitter through a communications channel into the communications receiver;

means for digitizing the a first portion of the radio frequency signal during a first time period and generating a first data signal, which comprises samples, in response thereto;

means for estimating characteristics of the communications channel in response to a portion of the first data signal, and for generating a first channel estimate in response thereto;

means for digitizing a second portion of the radio frequency signal during a second time period and for generating a second data signal, which comprises samples, in response thereto;

means for determining an estimated velocity of the communications receiver relative to the communications transmitter;

means for weighting the first channel estimate in response to the estimated velocity;

means for generating a revised channel estimate in response to the weighting of the first and second channel estimate, and in response to the second data signal.

11. A digital communications receiver for adjusting an equalizer in response to a relative velocity between the communications receiver and a communications transmitter, the digital communications receiver including:

a receiver that receives a radio frequency signal from the communications transmitter through a communications channel into the communications receiver;

an analog to digital converter coupled to the receiver, the analog to digital converter converting a first portion of the radio frequency signal during a first time period and generating a first data signal, which comprises samples, in response thereto, the analog to digital converter further converting a second portion of the radio frequency signal during a second time period and generating a second data signal, which also comprises samples, in response thereto;

a channel estimator coupled to the analog to digital converter, the channel estimator estimating characteristics of the communications channel in response to the first data signal, and generating a first channel estimate in response thereto;

a processor coupled to the channel estimator, the processor determining an estimated velocity of the communications receiver relative to the communications transmitter, and weighting the first channel estimate in response to the estimated velocity, the processor generating a revised channel estimate in response to the weighting of the first channel estimate, and in response to the second data signal.

12. The digital communications receiver of claim 11 including:

a memory coupled to said analog to digital converter, the memory storing sequentially said samples received during said first time period;

said processor processing said samples received during said first time period, having been stored, starting with a first received sample in said first time period, and storing in a forward sequence with respect to time beyond a most probable error location, using a preselected maximum likelihood sequence estimation procedure to generate one group of estimates of said radio frequency signal, and processing said samples, having been stored, starting with a last received sample in said first time period, and storing in a reverse sequence with respect to time beyond the most probable error location, using the preselected maximum likelihood sequence estimation procedure to generate another group of estimates of said radio frequency signal, and processing the one and the other groups of estimates of said radio frequency signal to generate enhanced estimates of said radio frequency signal.

* * * * *